(12) United States Patent
Yagi et al.

(10) Patent No.: US 10,072,807 B2
(45) Date of Patent: Sep. 11, 2018

(54) VEHICULAR HEADLAMP

(71) Applicant: Koito Manufacturing Co., Ltd., Tokyo (JP)

(72) Inventors: Takayuki Yagi, Shizuoka (JP); Noriko Sato, Shizuoka (JP); Toshiaki Tsuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/660,367

(22) Filed: Jul. 26, 2017

(65) Prior Publication Data

US 2018/0045393 A1  Feb. 15, 2018

(30) Foreign Application Priority Data

Aug. 10, 2016  (JP) ................................. 2016-157244

(51) Int. Cl.

| | |
|---|---|
| *F21S 41/25* | (2018.01) |
| *F21S 41/675* | (2018.01) |
| *F21S 41/20* | (2018.01) |
| *F21V 9/30* | (2018.01) |
| *B60Q 1/068* | (2006.01) |
| *G02B 26/08* | (2006.01) |

(Continued)

(52) U.S. Cl.
CPC ............ *F21S 41/25* (2018.01); *B60Q 1/0683* (2013.01); *F21S 41/16* (2018.01); *F21S 41/176* (2018.01); *F21S 41/19* (2018.01); *F21S 41/255* (2018.01); *F21S 41/285* (2018.01); *F21S 41/321* (2018.01); *F21S 41/675* (2018.01); *F21V 9/30* (2018.02); *G02B 26/0816* (2013.01)

(58) Field of Classification Search
CPC ........ F21S 41/25; F21S 41/675; F21S 41/176; F21S 41/16; F21S 41/255; F21S 41/19; F21V 9/30

See application file for complete search history.

(56) References Cited

U.S. PATENT DOCUMENTS

| | | | |
|---|---|---|---|
| 9,890,918 B2 * | 2/2018 | Singer | ................... F21S 41/14 |
| 2012/0327678 A1 * | 12/2012 | Koike | ................. B60Q 1/085 |
| | | | 362/520 |

(Continued)

FOREIGN PATENT DOCUMENTS

| | | |
|---|---|---|
| JP | 2014-065499 A | 4/2014 |
| JP | 2016-046072 A | 4/2016 |
| KR | 10-2015-0094848 A | 8/2015 |

OTHER PUBLICATIONS

An Office Action dated Apr. 12, 2018, issued from the Korean Intellectual Property Office (KIPO) of Korean Patent Application No. 10-2017-0083191 and a Partial English translation thereof.

*Primary Examiner* — Anne Hines (74) *Attorney, Agent, or Firm* — Abelman, Frayne & Schwab (57) ABSTRACT

Provided is a vehicular headlamp including: an excitation light source; a scanning mechanism configured to scan light emitted by the excitation light source toward a predetermined direction; a projection lens; and a phosphor provided between the scanning mechanism and the projection lens and configured to transmit light scanned by the scanning mechanism toward the projection lens. The phosphor is formed as a curved body that is curved in a direction opposite to a curved image plane of the projection lens.

4 Claims, 6 Drawing Sheets

(51) Int. Cl.
*F21S 41/19* (2018.01)
*F21S 41/255* (2018.01)
*F21S 41/32* (2018.01)
*F21S 41/16* (2018.01)
*F21S 41/176* (2018.01)

(56) References Cited

U.S. PATENT DOCUMENTS

2015/0176792 A1\* 6/2015 Hager .................. F21S 41/125
 362/510
2015/0338044 A1\* 11/2015 Singer .................. F21S 41/285
 362/510

\* cited by examiner

VEHICULAR HEADLAMP

CROSS-REFERENCE TO RELATED APPLICATIONS

This application is based on and claims priority from Japanese Patent Application No. 2016-157244, filed on Aug. 10, 2016 with the Japan Patent Office, the disclosure of which is incorporated herein in its entirety by reference.

TECHNICAL FIELD

The present disclosure relates to a vehicular headlamp in which light stagnation hardly occurs in a light distribution pattern formed by using a scanning mechanism.

BACKGROUND

Japanese Patent Laid-open Publication No. 2014-065499 discloses a vehicular headlamp in which the light emitted from a solid light source that generates light emitting diode (LED) light or laser light is reflected and scanned toward a phosphor having two types of phosphor layers by a reflection device, which is a digital micromirror device having a tiltable mirror, and the light that is reflected again inside the phosphor is transmitted through an optical system (a projection lens), thereby forming a light distribution pattern in front of a vehicle.

SUMMARY

A reflection device of a vehicular headlamp in Japanese Patent Laid-open Publication No. 2014-065499 displays a drawing pattern of a predetermined shape such as, for example, a rectangle in an object in front of a vehicle by, for example, drawing a line of a predetermined length that extends in a left and right direction by reciprocally swinging reflected light from a solid light source that is turned on/off at a predetermined timing with a swinging mirror at a high speed, and by vertically stacking lines having a predetermined length extending in the left and right direction by repeating the high-speed reciprocating swinging while shifting the high-speed reciprocating swinging of the mirror in the left and right direction by a very short distance.

At this time, a mirror of the reflection device that reciprocates between left and right end portions of a predetermined reciprocating swinging region operates fastest from the left and right end portions to a central point and decelerates from the central point toward the left and right end portions, and the speed is instantly reduced to 0 at the left and right end portions, that is, an operation based on a sine curve is performed. Therefore, the luminous flux density of light reflected by the mirror becomes lowest at the central point where the mirror passes at the highest speed, increases as the mirror travels from the central point toward the left and right end portions and decelerates, and becomes highest at a turning point of the left and right end portions where the speed becomes 0 instantly.

The change in the luminous flux density has a problem in that in a white light distribution pattern serving as a vehicular headlamp, color unevenness occurs which gradually increases brightness from a central portion of the light distribution pattern to both end portions and light stagnation phenomenon occurs in which both end portions of the light distribution pattern appear to be excessively bright as compared to the central portion.

In consideration of the above-described problem, the present disclosure provides a vehicular headlamp in which light stagnation hardly occurs in a light distribution pattern formed by using a scanning mechanism.

In a vehicular headlamp including: an excitation light source; a scanning mechanism configured to scan light emitted by the excitation light source toward a predetermined direction; a projection lens; and a phosphor provided between the scanning mechanism and the projection lens and configured to transmit light scanned by the scanning mechanism toward the projection lens, the phosphor is formed as a curved body that is curved in a direction opposite to a curved image plane of the projection lens.

Generally, the light that is reflected from the plane of an object in front of a vehicle and transmitted through the projection lens passes through the projection lens to form an image plane curved toward the rear of the projection lens. On the contrary, the light distribution pattern that is displayed in front of a vehicle by passing through a planar plate-like phosphor and the projection lens is formed as a curved image plane that is convex forward rather than the plate-like phosphor. Therefore, the light distribution pattern imaged on the plane in front of a vehicle is obtained by forming the phosphor in a shape of a curved image plane of the projection lens.

However, there is a problem in that, even when the light distribution pattern by the light scanned by the scanning mechanism may be imaged on the plane, since the luminous flux density based on a scanning position is changed, that is, the luminous fluxes increase from left and right central positions of a scanning range toward the left and right end portions that are returning positions, light stagnation occurs in the returning positions, that is, the left and right end portions of the light distribution pattern.

(Function) According to the vehicular headlamp of the present disclosure, by transmitting the scanned light through a phosphor that is curved in a direction opposite to a curved image plane of the projection lens, a focal distance of the scanned light that passes through the phosphor and the projection lens becomes gradually larger as the scanning range approaches the returning positions of the left and right end portions from the left and right central positions, and a focal point of the scanned light that forms a light distribution pattern on the plane in front of the vehicle is gradually blurred as the scanning position approaches the left and right end portions from the central positions of the scanning range. The luminous flux density of the scanned light that is transmitted through the curved phosphor and is irradiated on the plane in front of the vehicle decreases as the scanning position approaches the left and right end portions from the central positions of the scanning range.

As a result, the luminous flux density of the scanned light, which is scanned by an operation based on a sine curve to form a light distribution pattern on the plane in front of the vehicle, increases due to decrease in the scanning speed from the central points of the scanning range toward the left and right end portions. Also, the luminous flux density of the scanned light becomes constant over the entire scanning range because, when the scanning range goes from the central points toward the left and right end portions, the phosphor curved in a direction opposite to the image plane is transmitted to reduce the scanning speed and offset increase/decrease of the density.

In a vehicular headlamp including: an excitation light source; a scanning mechanism configured to scan light emitted by the excitation light source toward a predetermined direction; a projection lens; and a phosphor provided between the scanning mechanism and the projection lens and configured to transmit light scanned by the scanning mechanism toward the projection lens, the phosphor is formed as a curved body that has a smaller curvature than a curved image plane of the projection lens and is curved in a same direction as the image plane.

(Function) According to the vehicular headlamp of the present disclosure, by transmitting the scanned light through the phosphor that has a smaller curvature than a curved image plane of the projection lens and is curved in the same direction as the image plane, the focal point of the scanned light that forms the light distribution pattern on the plane in front of the vehicle is gradually blurred as the scanning position approaches the left and right end portions from the central position of the scanning range, and the luminous flux density of the scanned light that is transmitted through the curved phosphor and is irradiated on the plane in front of the vehicle decreases as the scanning position approaches the left and right end portions from the central position of the scanning range.

As a result, the luminous flux density of the scanned light, which is scanned by an operation based on a sine curve to form a light distribution pattern on the plane in front of the vehicle, increases due to decrease in the scanning speed from the central points of the scanning range toward the left and right end portions. Also, the luminous flux density of the scanned light becomes constant over the entire scanning range because, when the scanning range goes from the central point toward the left and right end portions, the phosphor curved in a direction opposite to the image plane is transmitted to reduce the scanning speed and offset increase/decrease of the density.

In a vehicular headlamp including: an excitation light source; a scanning mechanism configured to scan light emitted by the excitation light source toward a predetermined direction; a projection lens; and a phosphor provided between the scanning mechanism and the projection lens and configured to transmit light scanned by the scanning mechanism toward the projection lens, the phosphor is formed to have a thickness that gradually becomes thinner from central portions toward the left and right end portions.

(Function) According to the vehicular headlamp of the present disclosure, since the thickness of the phosphor becomes gradually smaller from the central portion toward the left and right end portions, the light conversion efficiency by the phosphor gradually deteriorates from the center to the left and right end portions. The luminous flux density of the scanned light increases as the scanning position moves from the central positions of the scanning range toward the left and right end portions which are returning positions. Thus, the light scanned at the left and right side is strongly converted as the luminous flux becomes low density, and is weakly converted as the luminous flux density becomes high so that color density irradiated on the plane in front of the vehicle becomes constant.

Further, in a vehicular headlamp including: an excitation light source; a phosphor configured to transmit light by the excitation light source; a projection lens; and a scanning mechanism configured to scan light generated by the excitation light source toward the projection lens, an optical filter formed to have a gradually darker color from central portions toward the left and right end portions is provided between the scanning mechanism and the projection lens.

(Function) According to the vehicular headlamp of the present disclosure, by transmitting the scanned light that swings in the left and right direction for the optical filter formed to have a gradually darker color from the central portions toward the left and right end portions to reduce the luminous flux density, since the scanned light becomes gradually darker from the left and right central positions of the scanning range toward the left and right end portions, which are returning positions, the increase in the light amount felt by the increase of the luminous flux based on the scanning position of the scanned light is reduced.

According to the vehicular headlamp of the present disclosure, by gradually offsetting the increase in the luminous fluxes based on the scanning position of the scanned light by a phosphor of a predetermined shape to make the luminous fluxes of the plane in front of the vehicle that forms the light distribution pattern constant, light stagnation is prevented from occurring in the position of the left and right end portions of the scanning range so as to form the light distribution pattern that does not have color unevenness on the plane orthogonal to an optical axis.

Further, according to the vehicular headlamp of the present disclosure, by gradually offsetting the change in the color density due to the increase in the luminous flux of the scanned light based on the scanning position by the phosphor of a predetermined shape, light stagnation is prevented from occurring at the positions of the left and right end portions of the scanning position so as to form the light distribution pattern that does not have color unevenness on the plane orthogonal to the optical axis.

Further, according to the vehicular headlamp of the present disclosure, by gradually offsetting the gradually increasing luminous flux based on the scanning position of the scanned light by the optical filter, light stagnation is prevented from occurring in the position of the left and right end portions of the scanning position so as to form the light distribution pattern that does not have color unevenness on the plane orthogonal to the optical axis.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part thereof. The illustrative embodiments described in the detailed description, drawing, and claims are not meant to be limiting. Other embodiments may be utilized, and other changes may be made, without departing from the spirit or scope of the subject matter presented here.

Exemplary embodiments of the present disclosure will be described below based on FIG. 1 to FIGS. 6A and 6B. In each figure, the respective portions of the vehicular headlamp or the directions of the road viewed from the driver of a vehicle mounted with the vehicular headlamp are described as upper (Up), lower (Lo), left (Le), right (Ri), front (Fr), and rear (Re).

Figure 1:
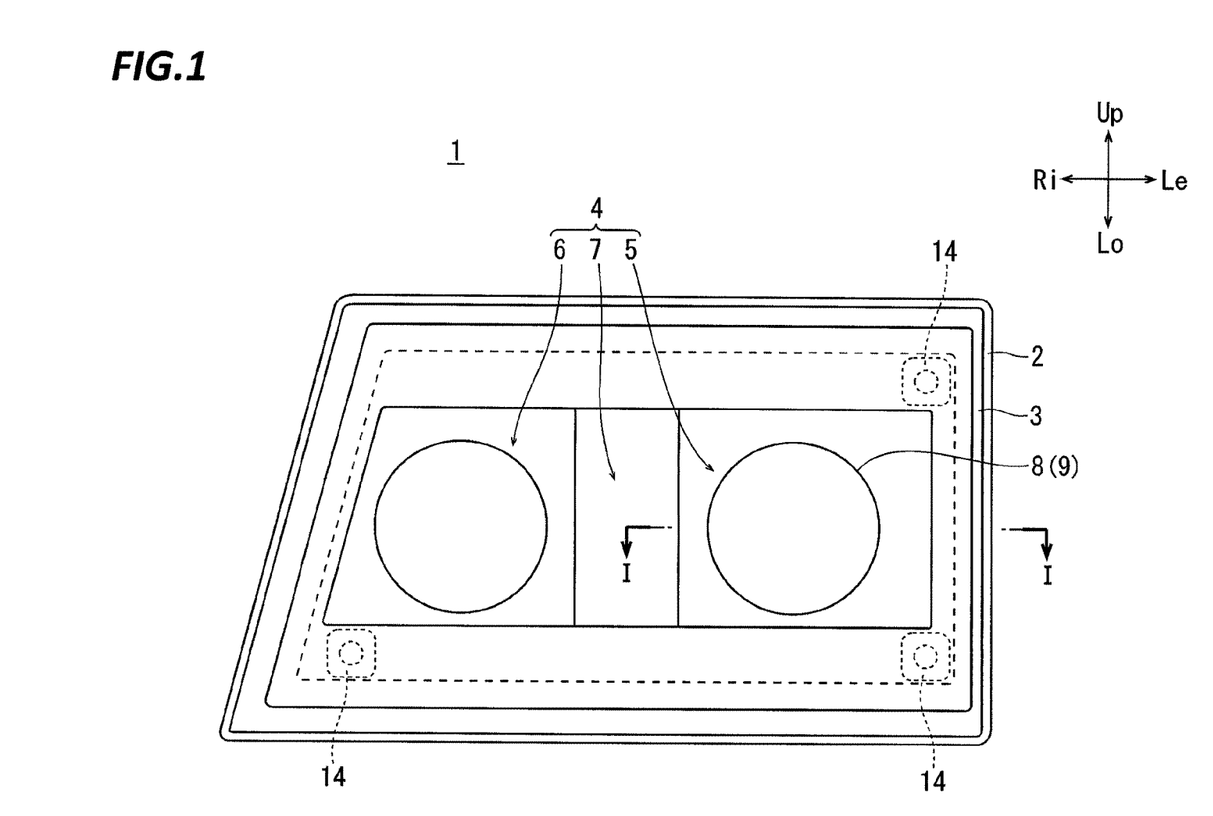
FIG. 1 is a front view of a vehicular headlamp according to a first exemplary embodiment.

The vehicular headlamp according to a first exemplary embodiment will be described with reference to FIG. 1, and FIGS. 2A and 2B. The vehicular headlamp 1 according to the first exemplary embodiment represents an exemplary right headlamp having a phosphor formed as a curved body which is convex forward, FIG. 1 is a front view of the vehicular headlamp according to the first exemplary embodiment, FIG. 2A is a cross-sectional view of the vehicular headlamp of the first exemplary embodiment, which is taken along line I-I, and FIG. 2B is a view illustrating optical paths in the vehicular headlamp 1.

The vehicular headlamp 1 of the first exemplary embodiment includes a lamp body 2, a front cover 3, and a headlamp unit 4. The lamp body 2 has an opening in the front side of the vehicle, and the front cover 3 is formed of a light-transmissive resin, glass, or the like and is attached to the opening of the lamp body 2 so as to define a lamp chamber S inside. The headlamp unit 4 illustrated in FIG. 1 is configured by integrating a high beam headlamp unit 5 and a low beam headlamp unit 6 with a metallic support member 7, and is disposed inside the lamp chamber S.

Figure 2A:
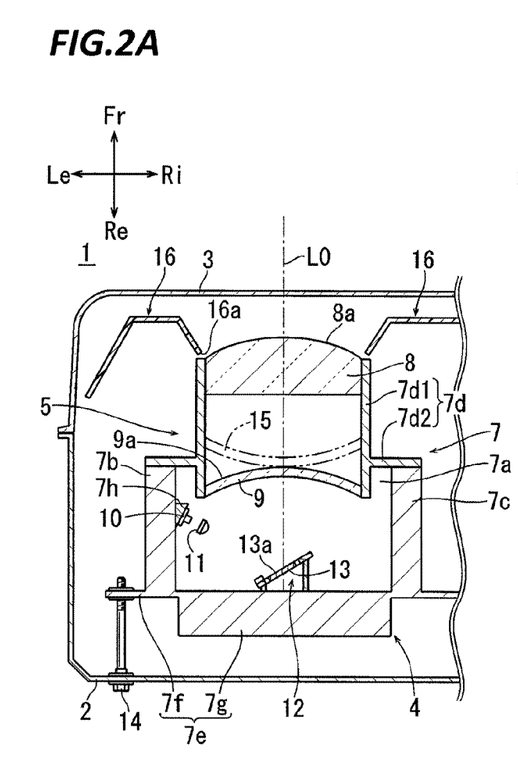
FIG. 2A is a cross-sectional view taken along line I-I of the vehicular headlamp according to the first exemplary embodiment, which has a phosphor that is convex forward.
Figure 2B:
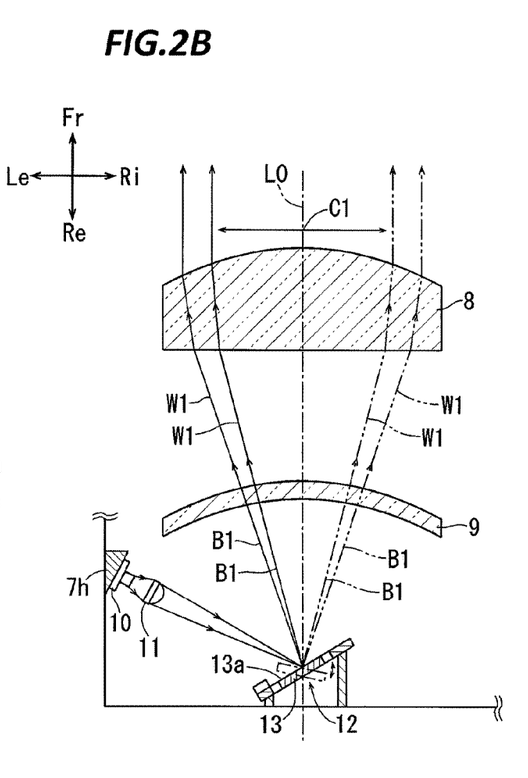
FIG. 2B is an explanatory view for explaining optical paths in the vehicular headlamp of the first exemplary embodiment.

Each of the high beam headlamp unit 5 and the low beam headlamp unit 6 has a projection lens 8, a phosphor 9, an excitation light source 10, a condenser lens 11, and a scanning mechanism 12, as illustrated in FIG. 2A, and these components are attached to the support member 7.

The support member 7 illustrated in FIG. 2A is formed of a metal and includes a bottom plate portion 7a, side plate portions 7b and 7c integrated with the left and right end portions of the bottom plate portion 7a, a lens support portion 7d integrated with the edges of the side plate portions 7b and 7c, and a base plate portion 7e integrated with the base ends of the side plate portions 7b and 7c. The lens support portion 7d is configured by a cylindrical portion 7d1 holding the projection lens therein and a flange portion 7d2 integrated with both the cylindrical portion 7d1 and the side plate portions 7b and 7c. The base plate portion 7e is configured by a screw fixing portion 7f and a heat radiating portion 7g which is larger in the depth than the screw fixing portion 7f.

The projection lens 8 illustrated in FIG. 2A is a transparent or semitransparent planoconvex lens in which the light emitting surface 8a is formed in a convex shape, and is fixed to the inner side of the front end portion of the cylindrical portion 7d1 of the lens support portion 7d so as to be convex forward. The phosphor 9 has a curved shape that is convex forward and is fixed to the inner side of the base end portion of the cylindrical portion 7d1 of the lens support portion 7d behind the projection lens 8.

The excitation light source 10 illustrated in FIG. 2A is configured by a blue or violet LED light source or a laser light source, and is fixed to a light source support portion 7h provided on the left side plate portion 7b of the support member 7 so as to radiate heat during lighting. The phosphor 9 is configured to generate a white light. When the excitation light source 10 is blue, the phosphor 9 is formed as a yellow phosphor, and when the excitation light source 10 is violet, the phosphor 9 is formed as a yellow-blue phosphor, or a phosphor having at least three colors of red-green-blue (RGB).

The scanning mechanism 12 illustrated in FIG. 2A is a scanning device having a reflector 13 that is tiltable in two axial directions and is fixed to the front surface of the heat radiating portion 7g. The condenser lens 11 is a transparent or semitransparent planoconvex lens in which the light emitting surface is formed in a convex shape, and is fixed to one of the bottom plate portion 7a and the base plate portion 7e in a state of being disposed between the excitation light source 10 and a reflective surface 13a of the reflector 13. Three aiming screws 14 rotatably held to the lamp body 2 are screwed to the screw fixing portion 7f of the base plate portion 7e of the support member 7 so that the headlamp unit 4 is tiltably supported for the lamp body 2.

As illustrated in FIG. 2B, the emitted light B1 of the excitation light source 10 is condensed on the reflective surface 13a of the reflector 13 by the condenser lens 11, and the scanning mechanism 12 displays a drawing pattern of a predetermined shape by reciprocally swinging the reflector 13 in the left and right direction at a high speed, while shifting the reflector 13 in the left and right direction by a very short distance and by vertically stacking lines drawn in a predetermined length. Specifically, the light B1 emitted from the excitation light source 10 is incident on the condenser lens 11 to be condensed on the reflective surface 13a and is swung by the reflector 13 in the left and right direction to be reflected toward the phosphor 9 which is a curved body. The phosphor 9 transmits the reflected light B1 as a white light W1 toward the projection lens 8 and transmit the white light W1 through a front end opening 16a of an extension reflector 16 inside the lamp chamber S and the front cover 3. The white light W1 is focused on the surface orthogonal to an optical axis and is scanned by the scanning mechanism 12 to display a white high beam light distribution pattern in front of the vehicle. For the scanning mechanism 12, various scanning mechanisms such as, for example, a Galvano mirror as well as a MEMS mirror may be adopted.

Here, the shape of the phosphor 9 according to FIG. 2A will be described in detail. For example, the light emitted from a flat surface orthogonal to an optical axis L0 in front of the vehicle, that is, the light reflected by the flat surface and transmitted through the projection lens 8, is imaged as a bowl-shaped image plane 15 that is convex rearward in the rear side of the projection lens 8. Further, in the case where a plate-like phosphor is disposed between the projection lens 8 and the scanning mechanism 12, the light emitted from the excitation light source 10 to be scanned forward by the scanning mechanism 12 and to be transmitted through the plate-like phosphor images a light distribution pattern formed of a bowl-like curved image plane (not illustrated)

that is not plate-like but is convex forward in front of the projection lens 8. Since the light emitted from the flat surface to be transmitted through the convex projection lens forms a focal point on the image plane curved in a bowl shape, the light, which is emitted from a curved body in a bowl shape to the contrary, forms a focal point on the flat surface. Therefore, when the light scanned by the scanning mechanism 12 is transmitted through each of the phosphor formed in the shape of a bowl-like curved image plane 15 and the convex projection lens, the light distribution pattern formed by the scanned light forms a focal point on the flat surface, thereby being clearly imaged on the flat surface.

However, the reflector 13 that reciprocates between the left and right end portions of a predetermined investigation region illustrated in FIG. 2B operates fastest at the central point C1 from the left and right end portions, decelerates from the central point C1 of the investigation region toward the left and right end portions, and is scanned by the operation of instantly reducing the speed to 0 at the left and right end portions and returning, that is, the operation based on a sine curve so that the luminous flux density of the light scanned by the scanning mechanism 12 increases due to the decrease in the scanning speed, which is caused from the central point C1 of the scanning range toward the left and right end portions. Therefore, even when the light distribution pattern by the light scanned by the scanning mechanism 12 may be imaged on a flat surface, there is a problem in that light stagnation occurs at the left and right end portions of the light distribution pattern since the luminous fluxes increase from the left and right central positions of the scanning range toward the left and right end portions which are returning positions.

Therefore, in the vehicular headlamp 1 of this exemplary embodiment, the phosphor 9 is formed to be curved in a direction opposite to the curved image plane 15 of the projection lens 8 in order to make the focal distance of the scanned light passing through the phosphor 9 and the projection lens 8 gradually increase as the focal distance approaches the returning positions of the left and right end portions from the left and right central positions of the scanning range. The focal point of the scanned light passing through the phosphor 9 and the projection lens 8 is gradually blurred as the scanning position approaches the left and right end portions from the central positions of the scanning range, and since the luminous flux density of the scanned light decreases as the scanning position approaches the left and right end portions from the central positions of the scanning range, the brightness of the scanned light gradually decreases.

As a result, the luminous flux density of the scanned light, which increases as the scanning position approaches the left and right end portions from the central positions of the scanning range since the scanning is performed by the operation based on the sine curve, becomes constant over the entire scanning range since the increase/decrease in the density is offset due to transmission through the phosphor 9. Thus, light stagnation does not occur at the left and right end portions of the light distribution pattern formed by the scanned light.

Figure 3A:
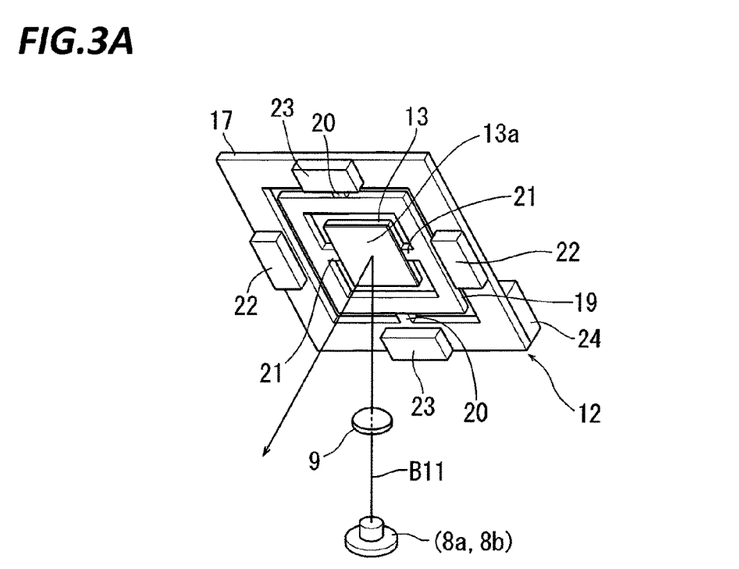
FIG. 3A is a perspective view of a scanning mechanism according to the first exemplary embodiment and a second exemplary embodiment as viewed obliquely from the front of a reflector.

Further, the scanning mechanism 12 illustrated in FIG. 2A includes a reflector 13, a base 17, a rotating body 19, a pair of first torsion bars 20, a pair of second torsion bars 21, a pair of permanent magnets 22, a pair of permanent magnets 23, and a terminal unit 24 as illustrated in FIG. 3A. A reflective surface 13a is formed by performing a processing such as, for example, silver vapor deposition or plating on the front surface of the reflector 13.

The plate-like rotating body 19 illustrated in FIG. 3A is supported by the base 17 in a state of being tiltable left and right by the pair of first torsion bars 20, and the reflector 13 is supported by the rotating body 19 in a state of being rotatable by the pair of second torsion bars 21. Each of the pair of permanent magnets 22 and the pair of permanent magnets is provided in a direction where the pair of first torsion bars 20 and the pair of second torsion bars 21 extend in the base 17, and each of the reflector 13 and the rotating body 19 is provided with a first coil and a second coil (not illustrated) which are independently controlled by a controlling mechanism (not illustrated) and powered through a terminal unit 24.

The rotating body 19 illustrated in FIG. 3A reciprocally tilts left and right around the axis of the first torsion bar 20 based on the power on/off of the first coil (not illustrated), and the reflector 13 reciprocally tilts up and down around the axis of the second torsion bar 21 based on the power on/off of the second coil (not illustrated). The reflected light B1 by the reflective surface 13a is scanned up and down and left and right toward the phosphor 9 based on the tilting of the rotating body 19 in the left and right direction and the tilting of the reflective surface 13a in the vertical direction. As illustrated in FIG. 2B, the light W1 whitened by being transmitted through the phosphor 9 passes through the projection lens 8 and the front cover 3, while being scanned up and down and left and right, and displays a white light distribution pattern of a predetermined shape based on the scanning aspect in front of the vehicle.

Figure 3B:
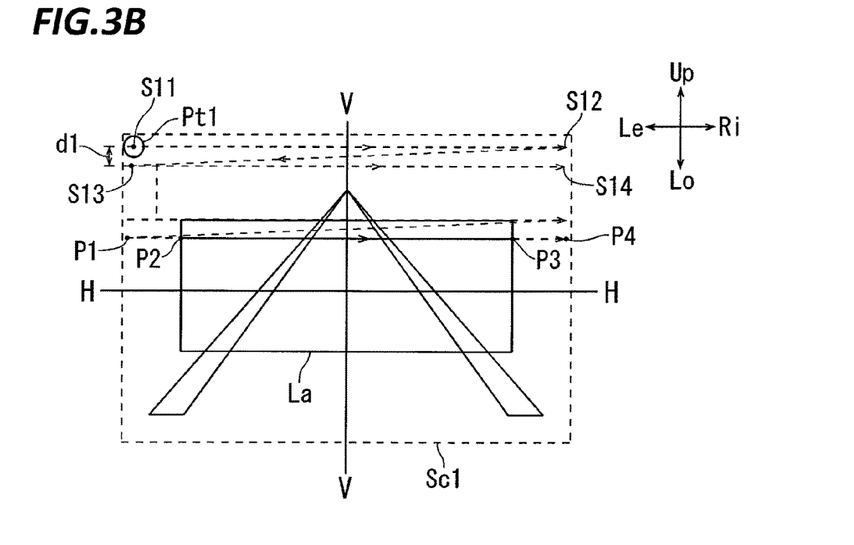
FIG. 3B is an explanatory view for explaining a high beam light distribution pattern by the vehicular headlamp according to the first exemplary embodiment and the second exemplary embodiment.

A light distribution pattern displayed in front of the vehicle by the scanning performed by the high beam headlamp unit 5 will be described as an example with reference to FIG. 3B. Symbol Pt1 indicates an optical image by the reflected light W1 illustrated in FIG. 2B. Within the rectangular scanning range (symbol Sc1) in front of the vehicle, the scanning mechanism 12 repeats, at a high speed, performing scanning from a left end S11 to a right end S12 based on the tilting of the reflector 13, then shifting the reflector 13 downward from the left end S11 by a very short distance d1, then tilting the reflector 13 obliquely downward to the left toward the next left end S13, and then performing scanning to the right end S13 again.

Based on the control of a lighting controlling device (not illustrated), the excitation light source 10 turns on light only, for example, in the section from P2 to P3 displaying a light distribution pattern, and turns off light in the section from P1 to P2 and the section from P3 to P4 where the light distribution pattern is not displayed. The scanning mechanism 12 repeats the operation of drawing line images at a high speed while performing the turning on and off of light at a predetermined position so as to laminate the line images vertically, thereby displaying the high beam light distribution pattern La in front of the vehicle. The low beam headlamp unit 6 also displays the low beam light distribution pattern by performing the same scanning (not illustrated).

Figure 4A:
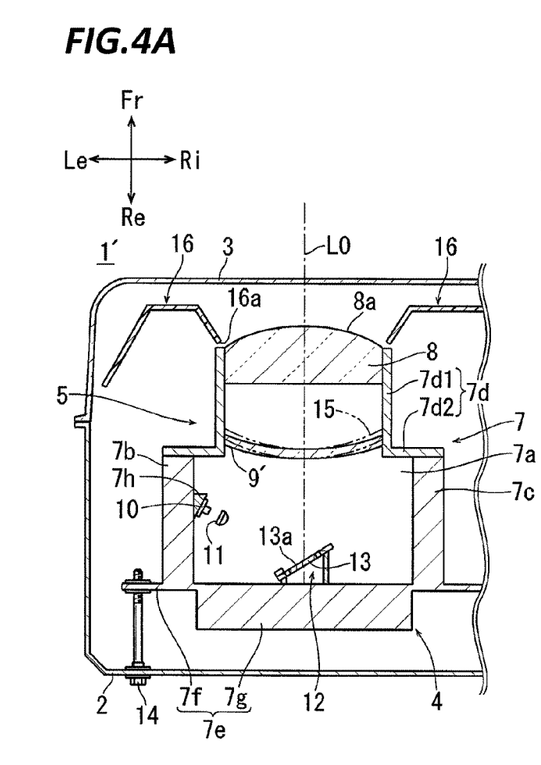
FIG. 4A is a cross-sectional view of the vehicular headlamp according to the second exemplary embodiment, which has a phosphor that is convex rearward.
Figure 4B:
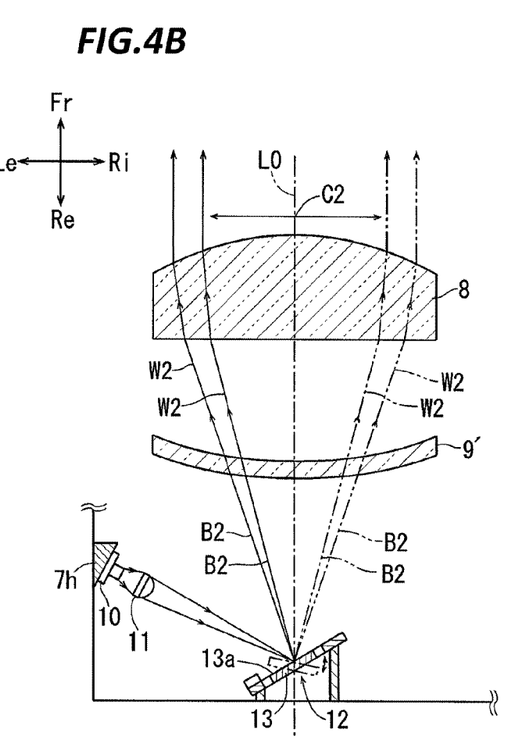
FIG. 4B is an explanatory view for explaining optical paths in the vehicular headlamp according to the second exemplary embodiment.

A vehicular headlamp 1' according to a second exemplary embodiment will be described below with reference to FIGS. 4A and 4B. The vehicular headlamp 1' of the second exemplary embodiment has a common configuration with the vehicular headlamp 1 of the first exemplary embodiment, except that a phosphor 9' which is convex rearward is provided instead of the phosphor 9. FIG. 4A is a cross-sectional view obtained by assuming that the vehicular headlamp 1' of the second exemplary embodiment is taken along line I-I in FIG. 1, and FIG. 3B is a view illustrating optical paths formed in the vehicular headlamp 1'.

As illustrated in FIG. 4A, the phosphor 9' of the second exemplary embodiment is formed as a curved body that has a smaller curvature than the curved image plane 15 behind the projection lens 8 and is curved to be convex in the same direction as the curved image plane, that is, rearward and is fixed to the inner side of the base end portion of the cylindrical portion 7d1 of the lens support portion 7d of the support member 7 behind the projection lens. Like the phosphor 9 of the first exemplary embodiment, the phosphor 9' is formed as a yellow phosphor, a yellow-blue phosphor, or a phosphor having at least three colors of red-green-blue (RGB) according to the colors emitted from the excitation light source 10, and the light emitted from the excitation light source 10 is white light.

The reflected light B2 by the reflective surface 13a is scanned up and down and left and right toward the phosphor 9' by the scanning mechanism 12. As illustrated in FIG. 2B, the light W2 which is whitened by transmitting through the phosphor 9' passes through the projection lens 8 and the front cover 3 and displays a white light distribution pattern of a predetermined shape in front of the vehicle.

With the scanning of the reflector 13 by the operation based on the sine curve, the luminous flux density of the scanned light B2 by the scanning mechanism 12 increases due to the decrease in the scanning speed, which is caused when the scanning range illustrated in FIG. 2B goes from the central point C2 toward the left and right end portions, and the luminous flux density becomes highest at the left and right end portions which are returning positions of the scanning. In the vehicular headlamp 1' of this exemplary embodiment, even when the phosphor 9' has a shape curved in the same direction as the curved image plane 15 of the projection lens 8, since the phosphor 9' has a smaller curvature than the curved image plane 15, the focal distance of the scanned light that passes through the phosphor 9' and the projection lens 8 gradually increases as the focal distance approaches the returning positions of the left and right end portions from the left and right central positions of the scanning range. Also, the luminous flux density of the scanned light decreases as the scanning position approaches the left and right end portions from the central positions of the scanning range, because the scanned light passes through the phosphor 9'. As a result, the luminous flux density of the scanned light that increases as the scanned light approaches the left and right end portions of the scanning range by the scanning performed by the operation based on the sine curve becomes constant over the entire scanning range since the scanned light is transmitted through the phosphor 9' to offset the decrease/increase of the density. Therefore, light stagnation does not occur at the left and right end portions of the light distribution pattern formed by the scanned light.

Figure 5A:
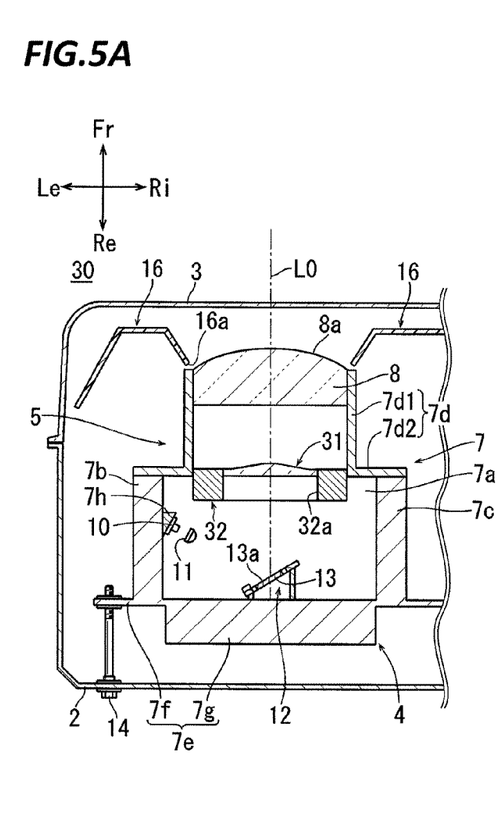
FIG. 5A is a cross-sectional view of a vehicular headlamp according to a third exemplary embodiment.
Figure 5B:
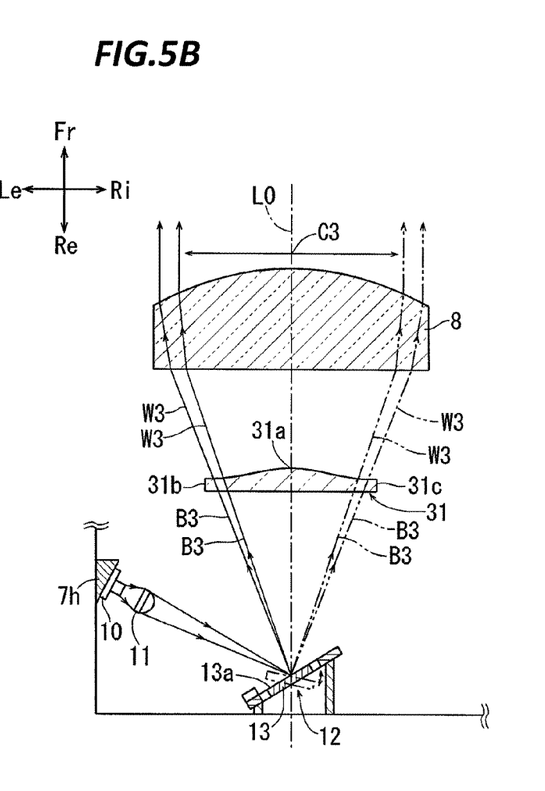
FIG. 5B is an explanatory view for explaining optical paths in the vehicular headlamp according to the third exemplary embodiment.

A vehicular headlamp 30 according to a third exemplary embodiment will be described below with reference to FIGS. 5A and 5B. The vehicular headlamp 30 of the third exemplary embodiment has a common configuration with the vehicular headlamp 1 of the first exemplary embodiment, except that a phosphor 31 is adopted instead of the phosphor 9 and the phosphor 31 fixed to the support member 7 through a holder 32. FIG. 5A is a cross-sectional view obtained by assuming that the vehicular headlamp 30 of the third exemplary embodiment is taken along line I-I in FIG. 1, and FIG. 5B is a view illustrating optical paths in the vehicular headlamp 30.

The holder 32 illustrated in FIG. 5A is formed in a hollow shape so as to have the same outer diameter as the inner diameter of the cylindrical portion 7d1 of the support member 7, and is fixed to the inner side of the base end portion of the cylindrical portion 7d1 of the lens support portion 7d behind the projection lens 8. Further, a square hole 32a is formed in the center of the holder 32.

The phosphor 31 is formed in a rectangular shape having a convex front surface and a flat rear surface, and is fixed in the vicinity of the front end portion of the square hole 32a. Further, the phosphor 31 is formed to be thickest in the front and rear direction in the central portion 31a intersecting with the optical axis L0 and to become gradually thinner in the front and rear direction at the same rate from the central portion 31a toward each of the left end portion 31b and the right end portion 31c. Like the phosphor 9 of the first exemplary embodiment, the phosphor 31 is formed as a yellow phosphor, a yellow-blue phosphor, or a phosphor having at least three colors of red-green-blue (RGB) according to the colors emitted from the excitation light source 10, and the light emitted from the excitation light source 10 is white light.

The reflected light B3 reflected by the reflective surface 13a is scanned up and down and left and right toward the phosphor 31 by the scanning mechanism 12. As illustrated in FIG. 5B, the light W3 which is whitened by being transmitted through the phosphor 31 passes through the projection lens 8 and the front cover 3 and displays a white light distribution pattern of a predetermined shape in front of the vehicle.

As illustrated in FIGS. 5A and 5B, since the phosphor 31 is formed to become gradually thinner in the front and rear direction from the central portion 31a toward each of the left and right end portions 31b and 31c, the conversion efficiency of the scanned light B3 passing through the phosphor 31 gradually deteriorates as the scanned light goes from the central portion 31a of the phosphor 31 toward the left and right end portions 31b and 31c. Further, the luminous flux density of the scanned light B3 scanned by the operation by the scanning mechanism 12 based on the sine curve increases as the scanned light goes from the central portion C3 of the scanning range toward the left and right end portions. In that case, the scanned light transmitted through the phosphor 31 is weakly converted as the luminous flux density increases from the central point of the scanning range toward the left and right end portions, and the scanned light is strongly converted as the luminous flux density decreases from the left and right end portions of the scanning range toward the central point. Therefore, the conversion efficiency in the phosphor 31 also changes according to the change in the luminous flux density. As a result, since the color density of the white light distribution pattern irradiated on the plane in front of the vehicle is made constant over the entire scanning range, light stagnation does not occur at the left and right end portions of the light distribution pattern.

Figure 6A:
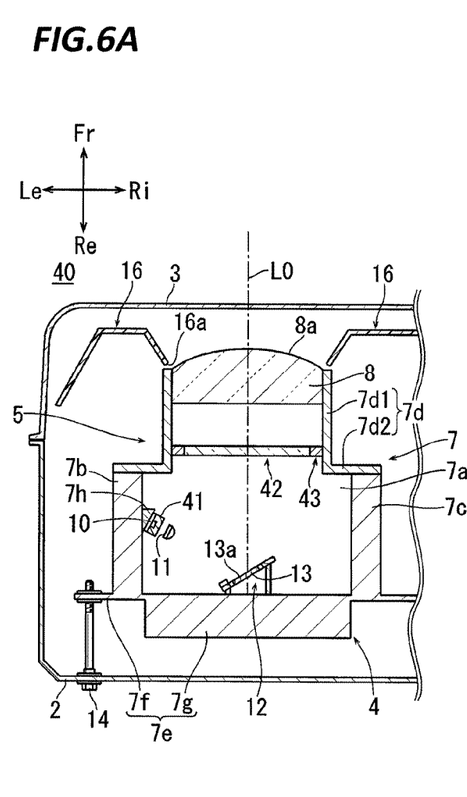
FIG. 6A is a cross-sectional view of a vehicular headlamp according to a fourth exemplary embodiment.
Figure 6B:
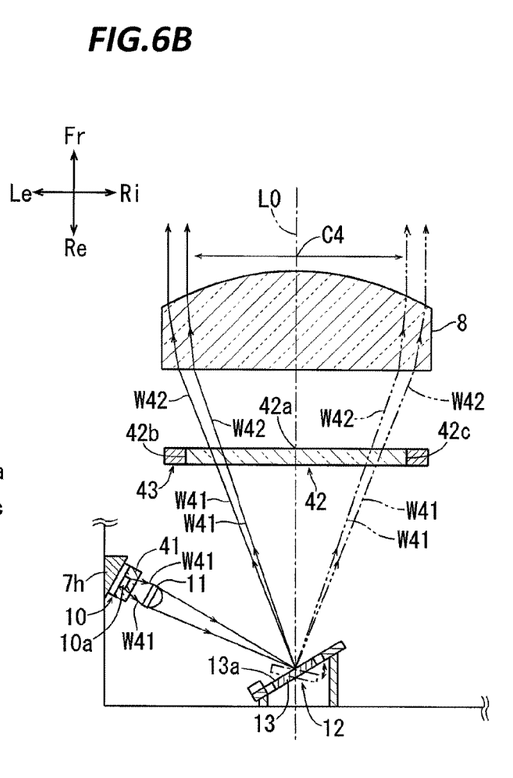
FIG. 6B is an explanatory view for explaining optical paths in the vehicular headlamp according to the fourth exemplary embodiment.

A vehicular headlamp 40 according to a fourth exemplary embodiment will be described below with reference to FIGS. 6A and 6B. FIG. 6A is a cross-sectional view obtained by assuming that the vehicular headlamp 40 of the fourth exemplary embodiment is taken along line I-I in FIG. 1, and FIG. 6B is a view illustrating an optical path by the vehicular headlamp 40. The vehicular headlamp 40 of the fourth exemplary embodiment has a common configuration with the vehicular headlamp 1 of the first exemplary embodiment, except that a phosphor 41 is adopted instead of the phosphor 9 and an optical filter 42 and a phosphor 43 are provided.

Specifically, the phosphor 41 of the fourth exemplary embodiment illustrated in FIGS. 5A and 5B is different from the phosphor 9 of the first exemplary embodiment, and is formed integrally with the excitation light source 10, not with the inner side of the edge portion of the cylindrical portion 7d1 of the support member 7 so as to surround a light emitting portion 10a of the excitation light source 10. Like the phosphor 9 of the first exemplary embodiment, the phosphor 41 is formed as a yellow phosphor, a yellow-blue phosphor, or a phosphor having at least three colors of red-green-blue (RGB) according to the colors emitted from the excitation light source 10, and the light emitted from the excitation light source 10 is white light W41. The light emitted from the excitation light source 10 is turned into white light W41 by the phosphor 41 to be emitted toward the condenser lens 11.

The holder 43 illustrated in FIGS. 6A and 6B is formed in a hollow shape so as to have the same outer diameter as the inner diameter of the cylindrical portion 7d1 of the support member 7 and is fixed to the inner side of the base end portion of the cylindrical portion 7d1 of the lens support portion 7d behind the projection lens 8. Further, a square hole 43a is formed in the center of the holder 43.

The optical filter 42 illustrated in FIGS. 6A and 6B is formed in a rectangular shape having the same shape as the square hole 43a when viewed from the front and is fixed in the vicinity of the front end portion of the square hole 43a. Further, the optical filter 42 is formed to have the palest color in the vicinity of the central portion 42a intersecting with the optical axis L0 and to have a gradually darker color from the central portion 42a toward the left end portion 42b and the right end portion 42c.

The white light W41 that is emitted from the excitation light source 10 and transmitted through the phosphor 41 is condensed on the reflective surface 13a of the reflector 13 by the condenser lens 11, and the reflected light W41 by the reflective surface 13a is scanned by the scanning mechanism 12 up and down and left and right toward the optical filter 42. The white light W42 that is transmitted through the optical filter 42 passes through the projection lens 8 and the front cover 3 and displays a white light distribution pattern of a predetermined shape in front of the vehicle.

The optical filter 42 illustrated in FIGS. 6A and 6B is formed to become gradually darker in color from the central portion 42a toward the left and right end portions 42b and 42c. The luminous flux density of the white light W42 scanned by the operation by scanning mechanism 12 based on the sine curve increases as the white light W42 goes from the central point C4 toward the left and right end portions, and since the white light W42 is transmitted through the optical filter 42, the luminous flux density thereof decreases as the white light W42 goes from the central portion 42a toward the left and right end portions 42b and 42c. As a result, the color density of the white light distribution pattern irradiated on the plane in front of the vehicle by the white light W5, which is transmitted through the optical filter 42, becomes constant over the entire scanning range since the increase in the luminous flux density, which is caused based on the scanning position, is offset, and light stagnation does not occur at the left and right end portions of the light distribution pattern.

Further, in the vehicular headlamp of the third exemplary embodiment, the phosphor 41 is integrated with the excitation light source 10 to be disposed between the excitation light source 10 and the condenser lens 11. However, in the vehicular headlamp of the third exemplary embodiment, the plate-like phosphor instead of the phosphor 41 may be fixed to the bottom plate portion 7a of the support member 7 so as to be disposed between the condenser lens 11 and the scanning mechanism 12. Alternatively, a phosphor may be formed in a disk shape connectable and fixable to the inner periphery of the cylindrical portion 7d1 of the support member 7 and fixed to the cylindrical portion 7d1 in the front or rear of the optical filter 42 so as to be disposed between the scanning mechanism 12 and the optical filter 42 or between the optical filter 42 and the projection lens 8.

From the foregoing, it will be appreciated that various embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicular headlamp comprising:
an excitation light source;
a scanning mechanism configured to scan light emitted by the excitation light source toward a predetermined direction;
a projection lens; and
a phosphor provided between the scanning mechanism and the projection lens and configured to transmit light scanned by the scanning mechanism toward the projection lens,
wherein the phosphor is formed as a curved body that is curved in a direction opposite to a curved image plane of the projection lens.

2. A vehicular headlamp comprising:
an excitation light source;
a scanning mechanism configured to scan light emitted by the excitation light source toward a predetermined direction;
a projection lens; and
a phosphor provided between the scanning mechanism and the projection lens and configured to transmit light scanned by the scanning mechanism toward the projection lens,
wherein the phosphor is formed as a curved body that has a smaller curvature than a curved image plane of the projection lens and is curved in a same direction as the image plane.

3. A vehicular headlamp comprising:
an excitation light source;
a scanning mechanism configured to scan light emitted by the excitation light source toward a predetermined direction;
a projection lens; and
a phosphor provided between the scanning mechanism and the projection lens and configured to transmit light scanned by the scanning mechanism toward the projection lens,
wherein the phosphor is formed to have a thickness that gradually becomes thinner from a central portion toward both left and right end portions.

4. A vehicular headlamp comprising:
an excitation light source;
a phosphor configured to transmit light by the excitation light source;
a projection lens; and
a scanning mechanism configured to scan light generated by the excitation light source toward the projection lens,
wherein the vehicular head lamp further comprises, between the scanning mechanism and the projection lens, an optical filter formed to have a gradually darker color from a central portion toward left and right end portions.

* * * * *